Aug. 4, 1925.
N. HELLER
BUMPER
Filed Sept. 12, 1924
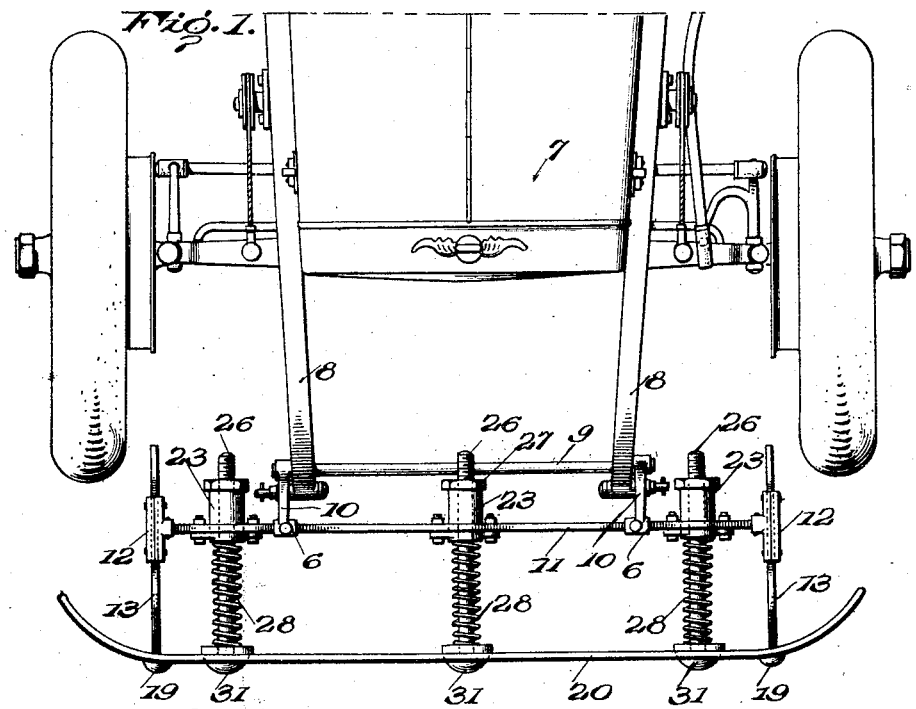
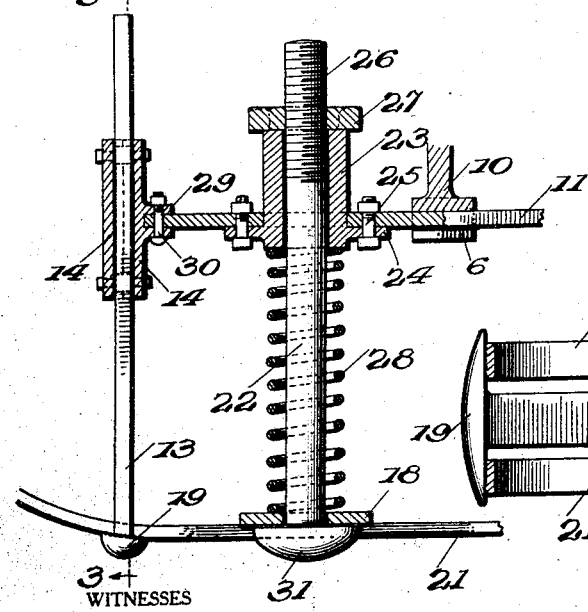
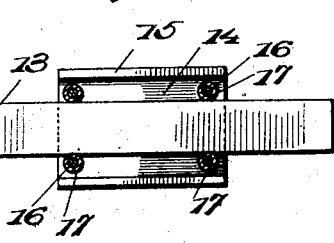
WITNESSES
W. A. Williams
INVENTOR
Nat Heller
BY Munn & Co.
ATTORNEYS Patented Aug. 4, 1925.

1,548,087

UNITED STATES PATENT OFFICE.

NAT HELLER, OF SAN FRANCISCO, CALIFORNIA.

BUMPER.

Application filed September 12, 1924. Serial No. 737,348.

*To all whom it may concern:*

Be it known that I, NAT HELLER, a citizen of the United States, and a resident of San Francisco, in the county of San Francisco and State of California, have invented certain new and useful Improvements in Bumpers, of which the following is a specification.

This invention relates to bumpers and is more particularly directed to a device incorporated in a bumper adapted to absorb shocks.

Bumpers as usually constructed are provided with a bar or a plurality of bars adapted to receive the impact during a collision and the bars are either of resilient material or are supported adjacent their ends by some form of brace bars of rigid construction or of semi-resilient material and as such the bumpers while aiding in the protection of the elements of an automobile are nevertheless so distorted that they are unfit for use.

It is an object therefore of my invention to provide a device which when receiving an impact from a moving vehicle or a stationary object will not only protect the car from injury but will be retracted in a manner to cushion the shock and prevent injury to the bumper.

Another object of the invention is the provision of a bumper which will not only absorb shocks but which is capable of inward movement at all points along the bumper whereby the strains of an impact during collision will be distributed evenly throughout substantially the length of the bumper and at right angles to the axis of the automobile to which the bumper has been applied.

A further object of the invention is the provision of a cushioning device for a bumper located at a point in the bumper where it will be most effective to receive an impact and counteract the bad effects to such an extent that not only the automobile is protected but the bumper itself will be in condition for further use.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a plan view of my improved bumper connected to an automobile.

Figure 2 is an enlarged fragmentary horizontal section of the bumper.

Figure 3 is an enlarged transverse vertical section of the bumper, taken along the line 3—3 of Figure 2.

Referring more particularly to the drawings 7 designates an automobile having vehicle frames 8 upon the outer ends of which is mounted a rod 9. This rod is provided at its opposite ends with supporting arms 10 carrying sleeves 6 which receive a supporting bar 11 for my bumper.

At the opposite ends of the bar 11 are secured guides 12 for sliding bars 13. These guides are formed of two similarly constructed U-shaped plates 14 having top and bottom inward extension 15, the edges of the extensions on one plate meeting the edges of the extensions of the complementary plate. Bolts 16 secure the sections together. Rollers 17 mounted on said bolts are adapted to be engaged by the top and bottom edges of the sliding bars 13.

It will be noted that the axles or bolts are so positioned that while the rollers engage the sliding bars 13 they do not touch the surfaces of the inward extensions 15 in order that no friction will impede the free operation of the rollers since it is necessary that the bars 13 shall respond promptly to a sliding action at the time of an impact.

The forward ends of the sliding bars 13 are provided with enlargements 19 so constructed that the bumper bars 20 and 21 may be welded thereto or secured in any approved manner to said enlargements and aid in supporting said bars forwardly of the automobile and in a position to receive an impact. The bumper bars are spaced in parallel relation one above the other.

Sliding bolts or rods 22 are mounted in bearings in the form of sleeves 23 which are inserted through spaced perforations in the bar 11 and secured to said bar by means of flanges 24 on the sleeves and bolts 25. The inner ends of the bolts 22 are threaded as shown at 26 to receive a nut 27 for adjusting the tension on a spring 28 coiled about said bolts and abutting at one end the outer end of the sleeve 23 and at its other end a plate 18 which is secured to the bars 20 and 21 and an enlargement 31 on the outer ends of a bolt or rod 22. The nut 27 also limits the outward movement of the rod 22 relative to the sleeve 23.

The opposite ends of the bar 11 are secured to the inner plates 14 of the guides 12 by means of flanges 29 formed on said plates and bolts or rivets 30. If desired the flanges 29 may be welded to the opposite ends of bar 11.

When the bumper bars 20 and 21 receive an impact due to a collision the bars are moved inwardly towards the automobile and resisted in their movements by the cushioning effect of the coil springs 28 and the springs are so located that they absorb the shocks along the most effective position of the bumper. During retrograde movement of the bumper bars the bolts or rods 22 slide in the sleeves 23 and the supporting bars 13 move rearwardly in their guides 12 and supported by the rollers 17. These bars 13 not only aid in supporting the bumper bars but also tend to cause the bumpers to move throughout their length along a line which coincides with the axis of the vehicles thus establishing a predetermined path of travel for the bars which will prevent distortion of the bumper during an impact of any violence. Furthermore, due to the fact that the bumper is substantially cushioned throughout its effective contacting portion, no single point on the bumper will be subjected to any severe strains and cause distortion of the bumper.

After the impact and inward movement of the rods against the tension of the springs, said springs will return the bumper and rods to their normal position.

What I claim is:

1. A bumper, bars connected to said bumper, and fixed guides to receive the bars and permit sliding of said bars, said guides comprising a pair of plates, cooperating flanges on the plates for spacing said plates and rollers mounted on the plates and engaged by the bars.

2. A bumper, a fixed bar provided with a plurality of spaced perforations, sleeves inserted through the perforations and having flanges in engagement with and secured to the fixed bar, rods slidably mounted in the sleeves and having their outer ends secured to the bumper, and springs embracing the rods and adapted to resist movement of the rods and bumper in one direction.

3. A bumper, a fixed bar provided with a plurality of spaced perforations, sleeves inserted through the perforations and having flanges in engagement with and secured to the fixed bar, rods slidably mounted in the sleeves and having their outer ends secured to the bumper, springs embracing the rods and adapted to resist movement of the rods and bumper in one direction, and means to limit the movement of the rods in one direction.

4. A bumper, a fixed bar, sleeves carried by the bar intermediate the ends of said bar, rods connected to the bumper and slidably mounted in the sleeves, resilient means adapted to resist movement of the rods, guides secured to the ends of the fixed bar, and bars secured to the bumper and slidably mounted in the guides.

NAT HELLER.